(12) United States Patent
Kim

(10) Patent No.: US 6,269,191 B1
(45) Date of Patent: Jul. 31, 2001

(54) PREDICTION IMAGE GENERATING APPARATUS USING MASK AND APPARATUS FOR CODING, TRANSMITTING AND DECODING A BINARY IMAGE USING THE SAME

(75) Inventor: Jin-soo Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/156,488

(22) Filed: Sep. 18, 1998

(30) Foreign Application Priority Data

Dec. 29, 1997 (KR) .................................................. 97-76413

(51) Int. Cl.[7] ....................................................... G06K 9/36
(52) U.S. Cl. ............................................................ 382/237
(58) Field of Search .................................... 382/232, 237, 382/238, 254, 270; 358/455, 456, 457, 459

(56) References Cited

U.S. PATENT DOCUMENTS

| | | | |
|---|---|---|---|
| 5,526,438 | * | 6/1996 | Barton .................................. 382/237 |
| 5,761,325 | * | 6/1998 | Barton .................................. 382/100 |
| 5,787,238 | * | 7/1998 | Wang .................................... 395/109 |
| 5,974,228 | * | 10/1999 | Heitsch ................................ 395/109 |
| 5,978,554 | * | 11/1999 | Hakamada et al. .................. 395/109 |
| 6,020,978 | * | 2/2000 | Cooper et al. ....................... 358/1.9 |
| 6,064,773 | * | 5/2000 | Yamagata et al. ................... 382/237 |

\* cited by examiner

*Primary Examiner*—Jose L. Couso
(74) *Attorney, Agent, or Firm*—Staas & Halsey LLP

(57) ABSTRACT

A prediction image generating apparatus using a plurality of masks and an apparatus for coding, transmitting and decoding a binary image using the same. The prediction image generating apparatus includes a maximum value searching unit, a minimum value searching unit, a mean calculation unit, a binarization unit and a comparing unit. The maximum value searching unit searches a maximum value of element values of one of the masks corresponding to a pixel having one binary level among a plurality of pixels located in front of the pixel having the current binary level to be predicted in a window of a predetermined size. The minimum value searching unit searches a minimum value of element values of the one mask corresponding to a pixel having the other binary level among a plurality of pixels located in front of the pixel having the current binary level to be predicted in the window of the predetermined size. The mean calculation unit takes an average of the maximum value and the minimum value searched from the maximum value searching unit and the minimum value searching unit. The binarization unit binarizes the average determined in the mean calculation unit. The comparing unit compares the binarized average with the binary level of the current pixel and outputs prediction image data indicating a successful or a failed prediction. Accordingly, when an image obtained by binarizing a document of pictures as well as text documents is transmitted, good picture quality and high coding efficiency are realized.

20 Claims, 4 Drawing Sheets

FIG. 1A PRIOR ART
0000001111000111111100000
FIG. 1B PRIOR ART
000000    1111    000    111111    00000
↓          ↓      ↓      ↓        ↓
0001      010    001     0001      011
⇒ 00010100010001011
FIG. 2
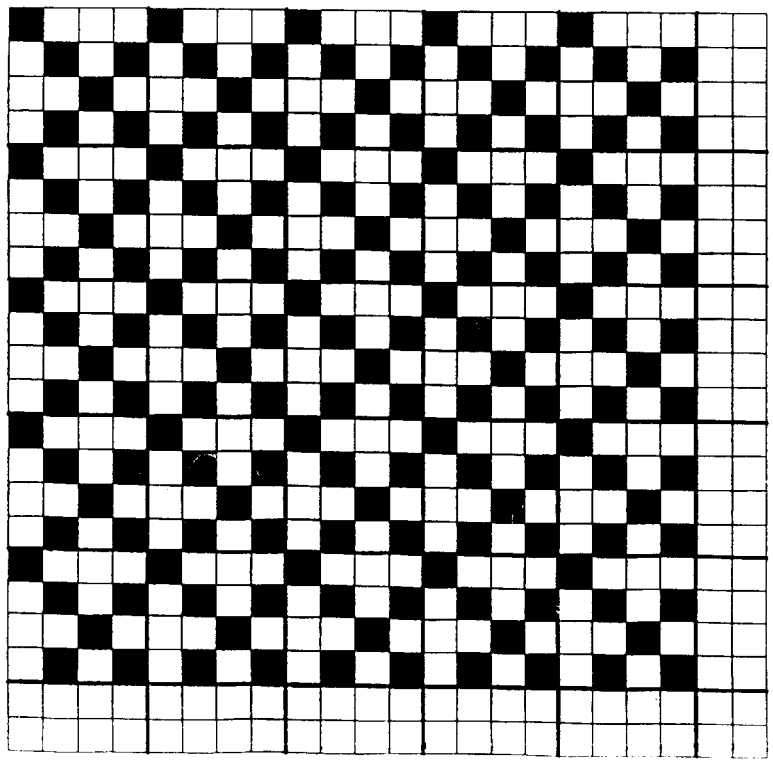
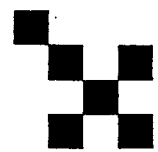
PATTERN OBTAINED BY
IMAGE HAVING MEAN
GRAY VALUE OF 80

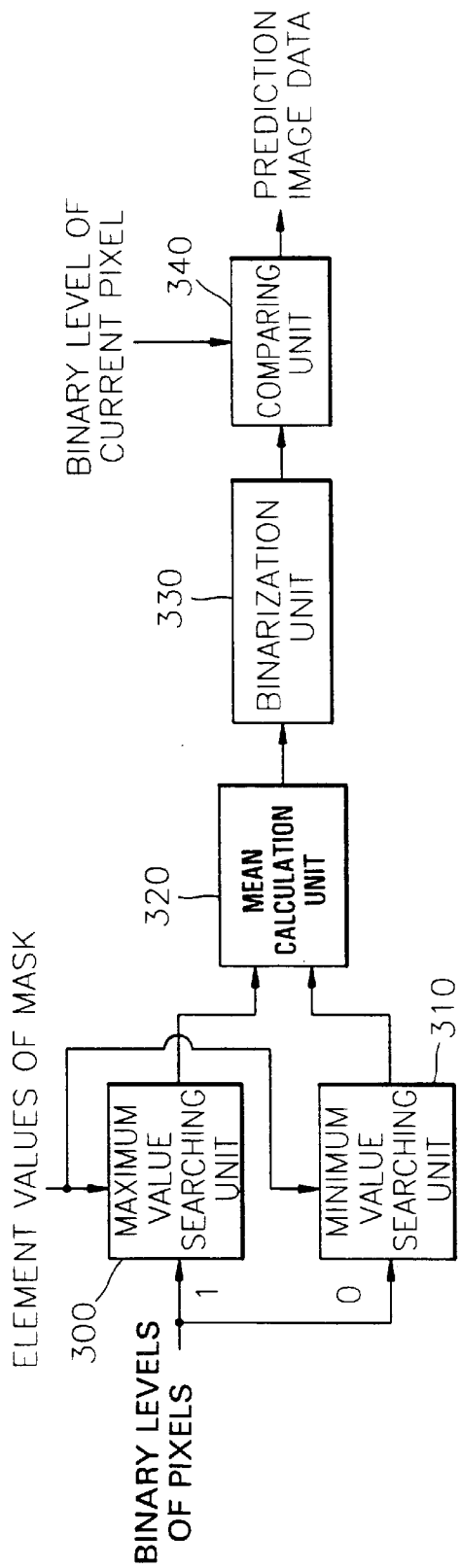
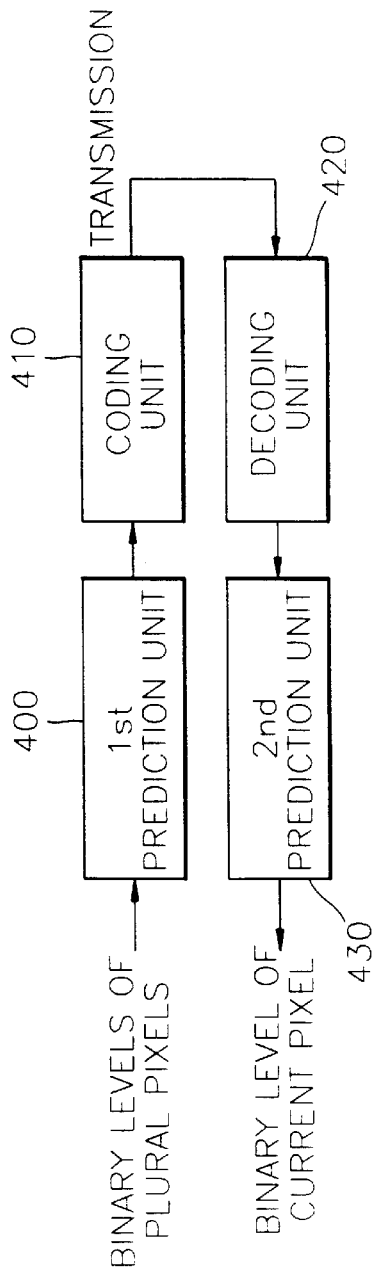

PREDICTION IMAGE GENERATING APPARATUS USING MASK AND APPARATUS FOR CODING, TRANSMITTING AND DECODING A BINARY IMAGE USING THE SAME

CROSS-REFERENCE TO RELATED APPLICATIONS

This application claims the benefit of Korean Application No. 97-76413, filed Dec. 29, 1997, in the Korean Patent Office, the disclosure of which is incorporated herein by reference.

BACKGROUND OF THE INVENTION

1. Field of the Invention

The present invention relates to image coding, and more particularly, to a prediction image generating apparatus using a plurality of masks, and to an apparatus for coding, transmitting and decoding a binary image using the same.

2. Description of the Related Art

Documents these days include characters or tables as well as text. Also, as color displays become more developed, various color photographs or pictures are used in computing. Since printers recognize only binary images, photographs or pictures to be printed are transformed into binary images using various methods for generating binary images, such as dithering or error diffusion.

Meanwhile, in a facsimile machine, the binary image of a scanned document is formed using the above-described methods for generating binary images, and the binary image is coded and transmitted. International Telecommunications Union-Telecommunication standarization (ITU-T) determines documents frequently transmitted by facsimile as a text document, and a coding method appropriate for the document. Also, various coding tables are determined by the document of a text. Thus, images obtained by binarizing the documents including pictures or photographs do not meet the requirements of the above coding methods.

That is, in facsimile machines, a document including photographs or pictures has a coding efficiency lower than a document containing only text. A conventional facsimile image coding standard uses a modified Huffman coding method. By the Huffman coding method, a series of black pixels indicated by 1 of a binary number in Table 1 or white pixels indicated by 0 thereof is mapped with a symbol of the coding table (Table 1) to compress the image.

For instance, assuming that a bit stream of a binary image before coding is as shown in FIG. 1A, a process of coding the binary image with reference to the Huffman table of Table 1 is as follows. First, a series of white pixels (000000) is mapped with 0001. Second, a series of black pixels (1111) is mapped with 010. Third, a series of white pixels (000) is mapped with 001. The binary images of FIG. 1A coded with reference to Table 1 become binary images shown in FIG. 1B.

TABLE 1

| Black pixels | Symbol | White pixels | Symbol |
|---|---|---|---|
| 1 | 1 | 1 | 1 |
| 2 | 01 | 2 | 01 |
| 3 | 001 | 3 | 001 |
| 4 | 010 | 4 | 010 |

TABLE 1-continued

| Black pixels | Symbol | White pixels | Symbol |
|---|---|---|---|
| 5 | 011 | 5 | 011 |
| 6 | 0001 | 6 | 0001 |

Referring to FIG. 1B, the coded binary image of FIG. 1A which has 24 pixels requires 17 bits, whereas the uncoded binary image requires 24 bits.

By the above Huffman coding method, as the series of white or black pixels of the binary image becomes longer, the coding becomes better. A text document has large spaces between lines and at the top, bottom and sides of the page, so that the series of white pixels is long, which satisfies the above conditions. However, the binary images of photographs or pictures do not have long series of pixels.

Thus, by the Huffman coding method, the coding efficiency for the binary images of pictures deteriorates. As a result, it takes longer to transmit text including pictures than to transmit text only.

SUMMARY OF THE INVENTION

To solve the above problems, it is an object of the present invention to provide a prediction image generating apparatus using a plurality of masks in which prediction image data represents a success or failure in prediction based on pixel values of a window and element values of one of the masks in the window, of a transmitting party.

It is another object of the present invention to provide an apparatus for coding, transmitting and decoding a binary image using the prediction image generating apparatus.

Additional objects and advantages of the invention will be set forth in part in the description which follows and, in part, will be obvious from the description, or may be learned by practice of the invention.

Accordingly, to achieve the first and other objects and advantages of the present invention, there is provided a prediction image generating apparatus using a plurality of masks. The apparatus includes a maximum value searching unit, a minimum value searching unit, a mean calculation unit, a binarization unit and a comparing unit.

The maximum value searching unit searches a maximum value of element values of one of the masks corresponding to a pixel having one binary level among a plurality of pixels located in front of a current pixel having a current binary level to be predicted in a window of a predetermined size. The minimum value searching unit searches a minimum value of element values of the one mask corresponding to a pixel having the other binary level among a plurality of pixels located in front of the pixel having the current binary level to be predicted in the window of the predetermined size. The mean calculation unit takes an average of the maximum value and the minimum value searched from the maximum value searching unit and the minimum value searching unit. The binarization unit binarizes the average taken in the mean calculation unit. The comparing unit compares the binarized average with a binary level of the current pixel and outputs prediction image data indicating successful or failed prediction.

To achieve the second and other objects and advantages of the present invention, there is provided an apparatus for coding, transmitting and decoding a binary image using the prediction image generating apparatus. The apparatus includes a first prediction unit, a coding unit, a decoding unit and a second prediction unit. The first prediction unit outputs the prediction image data indicating the successful or failed prediction based on the pixel values of the window and element values of the mask in a window of the image for transmission. The coding unit codes the prediction image data output from the first prediction unit by a predetermined coding method and transmits the coded data. The decoding unit decodes the coded data transmitted from the coding unit into prediction image data before coding. The second prediction unit predicts the binary level of the current pixel from the pixel values of the window and the element values of the mask in the window of the image for reception, based upon the prediction image data decoded in the decoding unit.

BRIEF DESCRIPTION OF THE DRAWINGS

The above objects and advantages of the present invention will become more apparent by describing in detail a preferred embodiment thereof with reference to the attached drawings, in which:

FIG. 1A shows a bit stream before coding of a binary signal;

FIG. 1B shows a bit stream after coding of the bit stream shown in FIG. 1A with reference to Table 1;

FIG. 2 shows a result of binarizing an image having a gray level average of 80 using a plurality of 4×4 masks;

FIG. 3 is a block diagram of a prediction image generating apparatus using a mask according to an embodiment of the present invention;

FIG. 4 is a block diagram of an apparatus for coding, transmitting and decoding a binary image using the apparatus shown in FIG. 3;

DESCRIPTION OF THE PREFERRED EMBODIMENT

Figure 5:
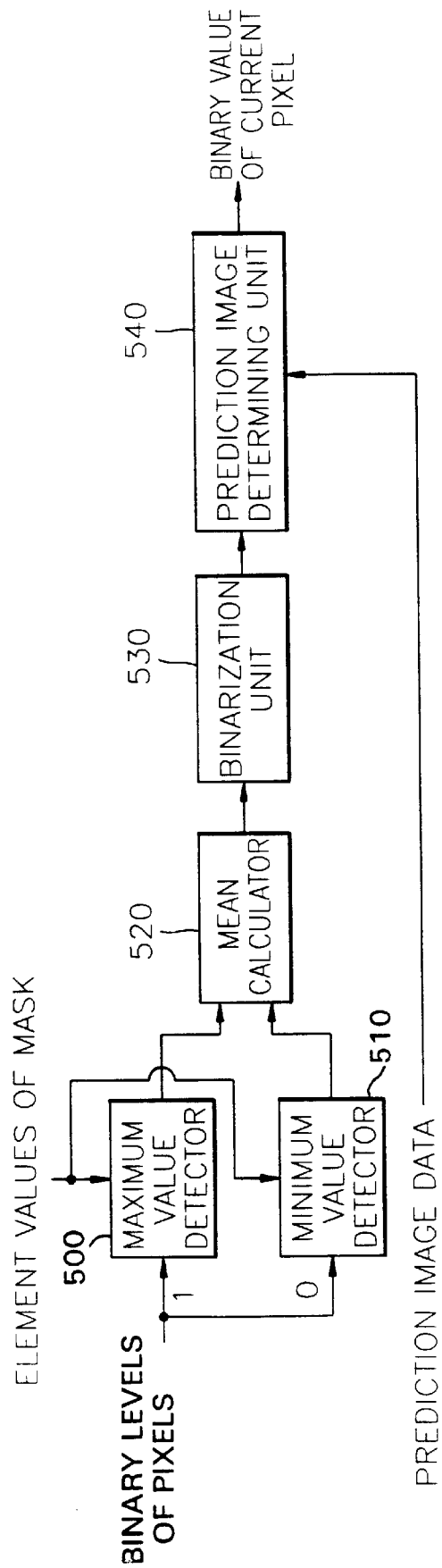
FIG. 5 is a detailed block diagram of a second prediction unit shown in FIG. 4.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

A method of binarizing an image having gray level values between 0 and 256 using a plurality of masks will now be described.

A 4×4 mask is as shown in Table 2. The method of binarizing the image uses a plurality of masks, such that a plurality of the same masks, like the 4×4 mask, are arranged on the image without overlapping each other. If the gray level of an arbitrary pixel of the image is larger than a corresponding element value of one of the masks, the pixel is regarded as white, and if smaller, as black.

TABLE 2

| 80 | 176 | 112 | 128 |
| 240 | 0 | 208 | 32 |
| 96 | 144 | 64 | 160 |
| 192 | 48 | 224 | 16 |

TABLE 3

| 80 | 176 | 112 | 128 | 80 | 176 | 112 | 128 |
| 240 | 0 | 208 | 32 | 240 | 0 | 208 | 32 |
| 96 | 144 | 64 | 160 | 96 | 144 | 64 | 160 |
| 192 | 48 | 224 | 16 | 192 | 48 | 224 | 16 |
| 80 | 176 | 112 | 128 | 80 | 176 | 112 | 228 |
| 240 | 0 | 208 | 32 | 240 | 0 | 208 | 32 |
| 96 | 144 | 64 | 160 | 96 | 144 | 64 | 160 |
| 192 | 48 | 224 | 16 | 192 | 48 | 224 | 16 |

Table 3 shows element values of four 4×4 masks arranged on an 8×8 image without overlapping each other. For convenience, it is assumed that the size of the coordinate increases downward (Y) and to the right (x) from the top, a pixel of an image of x=1 and y=1 meets with an element of x=1 and y=1 in the mask, where the element value is 80. Here, if the gray level of the pixel of the image of x=1 and y=1 is larger than a corresponding element value of the mask, the pixel is regarded as white. A pixel of x=2 and y=1 corresponds to an element of the mask of x=2 and y=1, where an element value is 176. In x=2 and y=1, if the gray level of a pixel of the image is smaller than the element of 176 of the mask, the pixel of the image is regarded as black. In the same manner, a pixel of x=5 and y=1 corresponds to an element of another identical 4×4 mask of x=1 and y=1. The binary values (binary pixel data) of pixels regarded as black and white are 0 and 1, respectively.

The result of binarizing an image having a mean gray level of 80 using a plurality of 4×4 masks is shown in FIG. 2. In FIG. 2, the same binary image is repeated in regions corresponding to each 4×4 mask. However, in an image such as a cloud or an ocean having similar gray levels, if the image is binary-coded using the identical masks of 4×4, the image has the same pattern. Thus, in the case that the gray level of the image does not change much, it is preferable that the image is binary-coded using masks having a large size such as a blue noise mask.

FIG. 3 is a block diagram of a prediction image generating apparatus using a plurality of masks according to an embodiment of the present invention and includes a maximum value searching unit 300, a minimum value searching unit 310, a mean calculation unit 320, a binarization unit 330 and a comparing unit 340.

The operation of the prediction image generating apparatus shown in FIG. 3 will be described with reference to FIG. 6.

If the size of a window is 5 in one-dimension, this number means the number of pixels in a window, which is a collection of previous pixels for predicting a binary level of a current pixel. A one-dimensional image means the pixels in a line. That is, in the case that the size of the window is 5, the binary levels of 5 previous pixels are considered in order to predict the binary level of the current pixel. Preferably, the above-described blue noise mask is used in FIG. 6.

Figure 6:
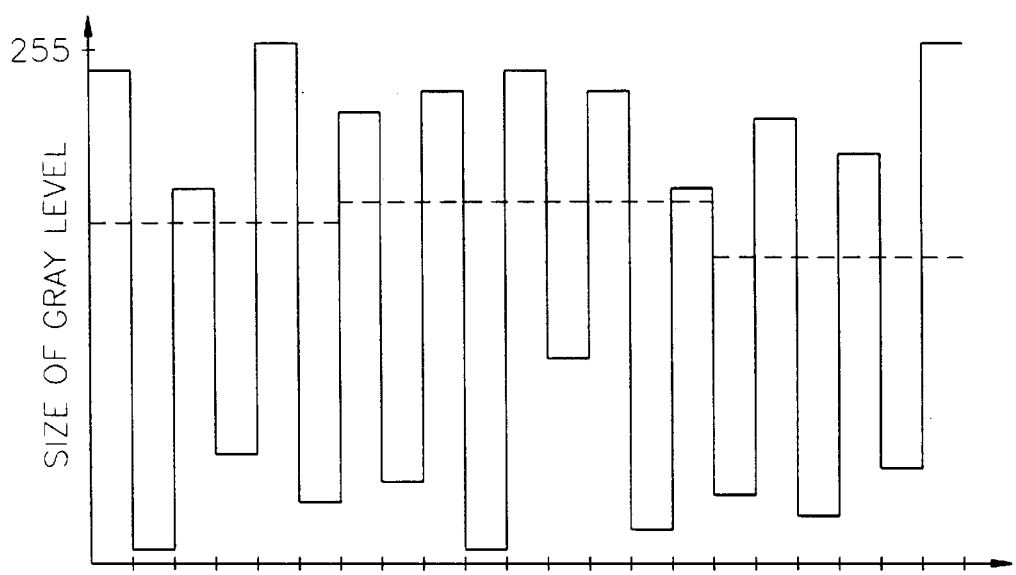
FIG. 6 is a diagram illustrating a process of generating prediction image data using a one-dimensional mask.

In FIG. 6, the dotted line denotes the gray level of an image, and the solid line denotes an element value of a mask. The gray level of the eighth pixel of FIG. 6 is predicted by considering the binary pixel data of the third through seventh pixels. If the pixel value within the window is larger than the corresponding element value, the binary pixel data is 1, and if the pixel value within the window is smaller, the binary pixel data is 0. The gray levels of the third, fifth and seventh pixels are smaller than corresponding element values of the mask, so that binary pixel data of the third, fifth and seventh pixels are 0. Also, binary pixel data of fourth and sixth pixels obtained in the same manner are 1.

The maximum value searching unit 300 preferably includes a comparator, and searches a maximum value of element values of the mask corresponding to pixels having binary pixel data of 1 among a plurality of pixels located in front of the pixel having the current binary level to be predicted in the window for prediction. Element values of the mask corresponding to pixels having binary pixel data of 1, i.e., the third, fifth and seventh pixels are 40, 20 and 30, respectively. Thus, the maximum values of the element values of the mask corresponding to the pixels having a binary pixel data of 1 is 40.

The minimum value searching unit 310 preferably includes another comparator, and searches a minimum value of element values of the mask corresponding to pixels having a binary pixel data of 0 among a plurality of pixels located in front of the current pixel having the current binary level to be predicted in the window for prediction. The element values of the mask corresponding to the fourth and sixth pixels, i.e., pixels having binary pixel data of 0, are 255 and 220, respectively. Thus, the minimum value of the element values of the mask corresponding to the pixels having a binary pixel data of 0 is 220.

The mean calculation unit 320 takes an average of the maximum and the minimum of the element values of the mask detected by the maximum value searching unit 300 and the minimum value searching unit 310. This is because the gray level m among the pixel having a binary pixel data of 0 and corresponding to the minimum value of the element value of the mask most approximates the gray level of the eighth pixel, and the gray level M among the pixels having a binary pixel data of 1 and corresponding to the maximum value of the element value of the mask most approximates the gray level of the eighth pixel. The gray levels of pixels in the window are similar, so that the gray level of a pixel to be currently predicted exists between M and m. Thus, the mean between M and m is predicted as the gray level of the eighth pixel.

The binarization unit 330 binarizes the mean between M and m determined in the mean calculation unit 320.

The comparing unit 340 compares the binarized mean with a binary level of the current pixel and outputs a predicted image value of 1 denoting success in prediction if the comparison result is the same, and a predicted image value of 0 denoting failure in prediction if the result is different. Of course, the values of 1 and 0 may be switched.

Figure 7:
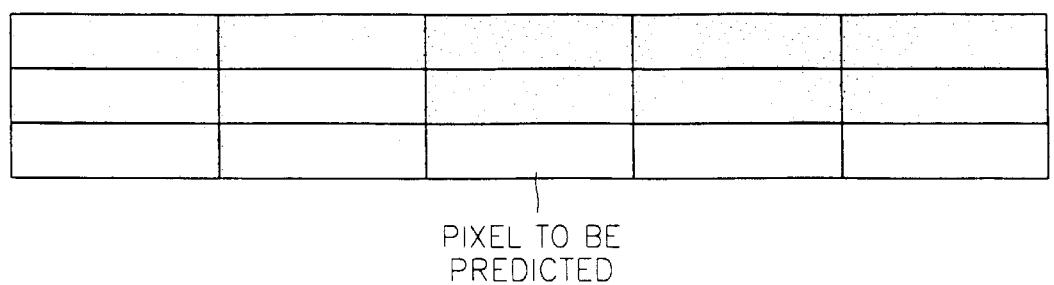
FIG. 7 is a diagram illustrating a process of generating prediction image data using a two-dimensional mask.

A method of predicting a binary level of a current pixel using a mask in a two-dimensional image will be described with reference to FIG. 7.

In a two-dimensional image, a two-dimensional window is applied, which is different from a one-dimensional image. The portion indicated by dots in FIG. 7 is a range of pixels (i.e., a window) considered to predict the binary level of a pixel. Here, the size and the form of the window have much influence on the changes in success in prediction. If the window is large, the binary levels of more adjacent pixels are considered, so that a value close to the binary level of a pixel to be predicted can be obtained. However, if the size of the window is more than a predetermined value, the probability of including an edge is increased, to thereby deteriorate the chances of successful prediction. Also, if the window is small, the probability of including an edge is reduced, and the binary levels of less adjacent pixels are considered, thereby lowering the chances of successful prediction. A 5×5 window has the most desirable prediction success probability among windows of 3×3, 5×5 and 7×7.

Table 4 shows the prediction success probability when the binary level of a pixel is predicted by an apparatus according to the embodiment of the present invention.

TABLE 4

| Image | Probability of prediction success | Entropy per pixel of binary image | Entropy per pixel obtained by an apparatus of the present invention |
|---|---|---|---|
| f16 | 93.0077% | 0.812398 | 0.290539 |
| lax | 91.9182% | 0.836587 | 0.316724 |
| cjs | 94.1292% | 0.944738 | 0.231682 |
| couple | 93.5249% | 0.951156 | 0.236787 |
| crowd | 93.4307% | 0.729155 | 0.267430 |
| einstein | 93.7794% | 0.932708 | 0.231523 |
| baboo | 90.7200% | 0.964175 | 0.349898 |
| black | 94.0174% | 0.717774 | 0.216667 |
| boats | 93.3815% | 0.932995 | 0.257539 |

In Table 4, the entropy denotes mean data amount, and the entropy per pixel denotes a mean bit required by a pixel and the maximum data amount capable of being theoretically coded.

If the binary level of the current pixel is successfully predicted, 1 is written as the current binary pixel data, otherwise, 0 is written. If the prediction from the previous pixels is successful, 1 is written as the binary pixel data, otherwise, 0 is written. In other words, 1 and 0 are prediction image data. Repetition of the above-described method enables a prediction image in which pixels having successfully or unsuccessfully predicted binary levels are arranged. As shown in Table 4, the prediction success probability is very high, so that the probability that the binary pixel data of the predicted image is 1 is increased, and the probability of 0 is lowered. By the Huffman coding method, as the number of pixels of white (bit=1) or black (bit=0) increases, the coding becomes better. Thus, if the image is coded by the prediction image generating apparatus shown in FIG. 3, the coding efficiency increases.

Table 5 shows the size after coding of the binary image using standard facsimile Huffman coding.

TABLE 5

| Image | Size after coding of binary image by a conventional coding method | Size after coding of prediction image according to an apparatus of the present invention |
|---|---|---|
| baboo | 78163 | 25013 |
| lax | 74633 | 22423 |
| black | 58686 | 17963 |
| boats | 74815 | 19415 |
| einstein | 81181 | 18464 |
| f16 | 58163 | 14499 |
| cjs | 75638 | 17697 |
| couple | 82082 | 19143 |
| crowd | 52953 | 19159 |

The size of the binary image is initially 32,768 bytes, i.e., approximately 32 Kbyte. In Table 4, the size of the image formed using the mask after coding by the conventional method is two to three times that of the initial image. However, if the image is coded using the prediction apparatus of the present invention, a coding efficiency is five to six times higher than that by the conventional coding method of binary image using the mask.

An apparatus as shown in FIG. 4 includes a first prediction unit 400, a coding unit 410 a decoding unit 420 and a second prediction unit 430. The structure and operation of the first prediction unit 400 are the same as those of the apparatus of FIG. 3. The first prediction unit 400 of a transmitting party and the second prediction unit 430 of a receiving party perform prediction in the same manner. Thus, if prediction in the transmitting party fails, prediction in the receiving party fails as well.

The second prediction unit 430 is shown in greater detail in FIG. 5 and includes a maximum value detector 500, a minimum value detector 510, a mean calculation unit 520, a binarization unit 530 and a prediction image determining unit 540.

The operations of the maximum value searching unit 500, the minimum value detector 510, the mean calculator 520 and a binarization unit 530 are the same as that of the maximum value searching unit 300, minimum value searching unit 310, mean calculation unit 310 and binarization unit 330 corresponding to the first prediction unit 400, and the operation of the prediction image determining unit 540 is different from that of the comparing unit 340 of the first prediction unit. The comparator of the first prediction unit 400 compares the binarized mean of the binarization unit 330 with a binary level of the current pixel. However, the prediction image determining unit 540 of the second prediction unit 430 outputs a value obtained by the binarized mean of the binarization unit 530 as the binary value of a current pixel if the prediction image data decoded in the decoding unit 420 is 1, and a value obtained by inverting the binarized mean, in which 0 is changed to 1 and 1 is changed to 0, as the binary value of the current pixel if the prediction image data is 0. It is possible to switch the values of 1 and 0 as well.

The operation of the apparatus shown in FIG. 4 will now be described.

The first prediction unit 400 predicts the binary level of the current pixel in the same manner as in the prediction image generating apparatus shown in FIG. 3, and then generates prediction image data including binary pixel data 1 which denotes successful prediction, or 0 which denotes failed prediction. The first pixel of an arbitrary image has no previous pixel values, so that prediction fails. Thus, first predicted image data of 0 or 1 is transmitted.

The coding unit 410 compresses the image predicted by the first prediction unit 400 by a predetermined coding method, preferably Huffman coding method.

In the receiving party, the coded and transmitted data is decoded to initial predicted image data by the decoding unit 420. The structure of the decoding unit 420 is the same as the decoding unit used for a conventional facsimile or printer.

The second prediction unit 430 outputs the binary level of the current pixel predicted using pixel values in the window of the image of the receiving party and the element values of the mask, if the prediction image data coded by the coding unit 410 is 1. The window of the receiving party is the same as the window of the transmitting party and the plurality of masks used by the maximum and minimum value detectors 500, 510 are the same as those used by the maximum and minimum value searching units 300, 310. Meanwhile, if the decoded prediction image data is 0, the image is successfully predicted, so that the binary level is inverted to be output.

An apparatus according to the present invention may be realized by adding prediction units before coding and after decoding to the structure of the conventional binary image transmitter. Also, the apparatus according to the present invention may be employed in a printer or a scanner as well as a facsimile machine.

According to the present invention, when an image obtained by binarizing a document of pictures as well as a text document of a text is transmitted, good quality and high coding efficiency can be realized with little change to the structure of the conventional apparatus of coding, transmitting and decoding an image.

It should be understood that the invention is not limited to the illustrated embodiment and that many changes and modifications can be made within the scope of the invention by a person skilled in the art.

What is claimed is:

1. A prediction image generating apparatus using a plurality of masks, comprising:

a maximum value searching unit to search a maximum value of element values of one of the masks corresponding to first pixels having one binary level among a plurality of pixels located in front of a current pixel having a current binary level to be predicted in a window of a predetermined size of an image;

a minimum value searching unit to search a minimum value of the element values of the one mask corresponding to second pixels having the other binary level among the plurality of pixels located in front of the current pixel having the current binary level to be predicted in the window of the predetermined size;

a mean calculation unit to determine an average of the maximum value and the minimum value searched from the maximum value searching unit and the minimum value searching unit;

a binarization unit to binarize the average determined by the mean calculation unit; and a comparing unit to compare the binarized average with the current binary level of the current pixel, to output prediction image data indicating successful or failed prediction.

2. The apparatus of claim 1, wherein the predetermined size of the window is 5×5.

3. The apparatus of claim 1, comprising:

a first prediction unit including the maximum value searching unit, minimum value searching unit, mean calculation unit, binarization unit and comparing unit to output the prediction image data indicating the successful or failed prediction in the window of the image for transmission;

a coding unit to code the prediction image data output from the first prediction unit by a predetermined coding method and transmit the coded data;

a decoding unit to decode the coded prediction image value transmitted from the coding unit into the prediction image data before coding; and a second prediction unit to predict the binary level of the current pixel from the pixel values of the window and the element values of the one mask in the window of the image for reception, based upon the prediction image data decoded in the decoding unit.

4. The apparatus of claim 1, wherein the coding unit performs the prediction image data output from the first prediction unit according to a Huffman coding method.

5. The apparatus of claim 3, wherein the second prediction unit comprises:

a maximum value detector to detect a maximum value of element values of the one mask corresponding to the first pixels having one binary level among the plurality of pixels located in front of the current pixel having the current binary level to be predicted in the window of the predetermined size of the prediction image data from the decoding unit;

a minimum value detector to detect a minimum value of element values of the one mask corresponding to the second pixels having the other binary level among the plurality of pixels located in front of the current pixel having the current binary level to be predicted in the window of the predetermined size of the prediction image data from the decoding unit;

a mean calculator to determine an average of the maximum value and the minimum value detected from the maximum value detector and the minimum value detector;

an another binarization unit to binarize the average determined in the mean calculator; and a prediction image determining unit to determine whether to output the binarized average or an inverted value of the binarized average based on the prediction image data decoded by the decoding unit.

6. The prediction apparatus of claim 1, wherein the window of the predetermined size is one-dimensional.

7. The prediction apparatus of claim 1, wherein the window of the predetermined size is two-dimensional.

8. A prediction image generating apparatus to generate prediction image data of an image divided into pixels, using a plurality of masks which do not overlap each other and have element values corresponding to the image pixels, the prediction image generating apparatus comprising:

a binary level generator to compare gray levels of the image pixels with the corresponding element values of the plurality of masks, to generate binary levels of predictive data for the image pixels to be predicted; and a comparing unit to compare the binary levels of the image pixels with the corresponding binary levels of the predictive data, to generate the prediction image data of the image, which is representative of a success or a failure in prediction of the image.

9. The prediction image generating apparatus as claimed in claim 8, wherein:

said binary level generator comprises
a maximum value searching unit to search for a maximum value among element values of one of the masks corresponding to first pixels of the image having a same first binary level among a plurality of pixels located in front of a current pixel having a current binary level, wherein the plurality of pixels form a window of a predetermined size,
a minimum value searching unit to search for a minimum value among the element values of the one mask corresponding to second pixels of the image having a same second binary level different from the first binary level among the plurality of pixels located in the window of the predetermined size,
a mean calculation unit to determine an average of the maximum and the minimum values, and
a binarization unit to binarize the average; and
said comparing unit compares the binarized average with the corresponding binary levels of the image pixels, to generate the prediction image data of the image.

10. The predication image generating apparatus as claimed in claim 9, wherein each of the plurality of masks is identical to one another and bordering other ones of the plurality of masks.

11. The prediction image generating apparatus as claimed in claim 9, wherein each mask has dimensions to be a blue noise mask.

12. The prediction image generating apparatus as claimed in claim 9, wherein each of the plurality of masks is identical to one another.

13. The prediction image generating apparatus as claimed in claim 9, wherein said comparing unit generates the prediction image data corresponding to a first pixel of the image, having no previous pixel values, to be indicative of a failed prediction.

14. An image processing device to process image data of an image divided into pixels, comprising:

a first prediction unit to generate prediction image data of the image data, using a plurality of masks which do not overlap each other and have element values corresponding to the image pixels, wherein the prediction image data represent a success or a failure in prediction of the image data; and a coding unit to code the prediction image data according to a predetermined coding method for transmission.

15. The image processing device as claimed in claim 14, wherein said first prediction unit comprises:

a binary level generator to compare gray levels of the image pixels with the corresponding element values of the plurality of masks, to generate binary levels of predictive data for the image pixels to be predicted; and a comparing unit to compare the binary levels of the image pixels with the corresponding binary levels of the predictive data, to generate the prediction image data of the image, which is representative of a success or a failure in prediction of the image.

16. The image processing device as claimed in claim 14, further comprising:

a decoding unit to decode the prediction image data received from said coding unit according to a predetermined decoding method; and a second prediction unit to generate second prediction image data of the decoded prediction image data, using the plurality of masks, wherein the second prediction image data represent a success or a failure of prediction of the decoded prediction image data.

17. The image processing device as claimed in claim 15, further comprising:

a decoding unit to decode the prediction image data received from said coding unit according to a predetermined decoding method; and a second prediction unit to generate second prediction image data of the decoded prediction image data, using the plurality of masks, wherein the second prediction image data represent a success or a failure of prediction of the decoded prediction image data;

wherein said second prediction unit comprises
a second binary level generator to compare gray levels of image pixels of the decoded prediction image data with the corresponding element values of the plurality of masks, to generate binary levels of predictive data for the image pixels of the decoded prediction image data; and
a prediction image determining unit to determine whether to output the binary levels of the predictive data for the image pixels of the prediction image data or inverted values thereof, based upon the corresponding prediction image data.

18. The prediction image generating apparatus as claimed in claim 17, wherein:

said second binary level generator comprises
a second maximum value searching unit to search for a second maximum value among element values of one of the masks corresponding to first pixels of the decoded prediction image data having a same first binary level among the plurality of pixels located in front of the current pixel having the current binary level, a second minimum value searching unit to search for a second minimum value among the element values of the one mask corresponding to second pixels of the decoded prediction image data having a same second binary level different from the first binary level among the plurality of pixels located in front of the current pixel having the current binary level, a second mean calculation unit to determine a second average of the second maximum and the second minimum values, and a second binarization unit to binarize the second average; and said prediction image determining unit determines whether to output the binary level of the second binarized average or the inverted value thereof, based upon the corresponding prediction image data.

19. An image processing device to process coded first prediction image data indicative of a success or a failure in prediction of image data of an image divided into pixels, comprising:

a decoding unit to decode the first coded prediction image data according to a predetermined coding method; and a prediction unit to generate second prediction image data of the decoded first prediction image data, using a plurality of masks which do not overlap each other and have element values corresponding to the coded image pixels, wherein the second prediction image data represent a success or a failure in prediction of the decoded first predicted image data.

20. The image processing device as claimed in claim 19, wherein said prediction unit comprises:

a maximum value searching unit to search for a maximum value among element values of one of a plurality of masks corresponding to first pixels of the decoded first prediction image data having a same first binary level among a plurality of pixels located in front of a current pixel having a current binary level, wherein the plurality of pixels form a window of a predetermined size;

a minimum value searching unit to search for a minimum value among the element values of the one mask corresponding to second pixels of the decoded first prediction image data having a same second binary level different from the first binary level among the plurality of pixels located in the window of the predetermined size;

a mean calculation unit to determine an average of the maximum and minimum values;

a binarization unit to binarize the average; and said prediction image determining unit determines whether to output the binary level of the binarized average or the inverted value thereof, based upon the corresponding first prediction image data.

* * * * *

UNITED STATES PATENT AND TRADEMARK OFFICE
CERTIFICATE OF CORRECTION

PATENT NO. : 6,269,191 B1
DATED : July 31, 2001
INVENTOR(S) : Jin-soo Kim

It is certified that error appears in the above-identified patent and that said Letters Patent is hereby corrected as shown below:

<u>Column 9,</u>
Line 58, "predication" should be -- prediction --.

Signed and Sealed this

Twenty-sixth Day of February, 2002

Attest:

*Attesting Officer*

JAMES E. ROGAN
*Director of the United States Patent and Trademark Office*